United States Patent [19]

Chu et al.

[11] Patent Number: 5,302,327
[45] Date of Patent: Apr. 12, 1994

[54] PROCESS FOR MAKING COATED POLYPROPYLENE FILM

[75] Inventors: Shaw-Chang Chu, Cranbury, N.J.; Kevin A. Kirk, Macedon; Leland W. Reid, Palmyra, both of N.Y.

[73] Assignee: Mobil Oil Corporation, Fairfax, Va.

[21] Appl. No.: 62,031

[22] Filed: May 17, 1993

Related U.S. Application Data

[63] Continuation of Ser. No. 813,168, Dec. 24, 1991, abandoned.

[51] Int. Cl.$^5$ ............................................. B29C 55/14
[52] U.S. Cl. ...................................... 264/22; 264/134; 264/171; 264/289.3; 264/289.6; 264/235.8; 264/290.2
[58] Field of Search ...................... 264/22, 289.3, 134, 264/514, 211, 210.6, 290.2, 289.6, 331.17, 235.8, 171

[56] References Cited

U.S. PATENT DOCUMENTS

| | | | |
|---|---|---|---|
| 3,022,178 | 2/1962 | Park et al. | 106/13 |
| 3,048,266 | 8/1962 | Hackbel et al. | 206/45.34 |
| 3,658,980 | 4/1972 | Caiola et al. | 264/210.6 |
| 4,118,438 | 10/1978 | Matsui et al. | 264/211 |
| 4,225,644 | 9/1980 | Tsuchiya et al. | 264/289.3 |
| 4,341,825 | 7/1982 | Kemski | 428/35 |
| 4,415,523 | 11/1983 | Barham et al. | 264/289.6 |
| 4,481,324 | 11/1984 | Hall et al. | 264/211 |
| 4,758,396 | 7/1988 | Crass et al. | 264/210.6 |
| 5,112,696 | 5/1992 | Roberts | 264/210.1 |

FOREIGN PATENT DOCUMENTS

434280  6/1991  European Pat. Off. .

OTHER PUBLICATIONS

European Search Report EP 92 31 1415, The Hague, Mar. 31, 1993.
Database WPIL Sect. Ch, Week 8623, Derwent Pub. Ltd., London; Class A92, AN 86-147723 & JP-A-61 083 038 (Dainippon Printing KK).
Database WPIL Sect. Ch, Week 8744, Derwent Publ. Ltd., London; Class A18, AN 87-311125 & JP-A-62 220 552 (Miyoshi Yushi KK).

*Primary Examiner*—Jeffery Thurlow
*Attorney, Agent, or Firm*—Alexander J. McKillop; Malcolm D. Keen; Marina V. Schneller

[57] ABSTRACT

A process for producing thermoplastic film which is an antifogging, heat-sealable polypropylene film; the antifogging agent is a polyglycerol ester or a sorbitan ester of a fatty acid. The resultant film, which has good clarity, persistent antifogging characteristics, and excellent heat sealability, is useful for packaging refrigerated foods. The disclosure also provides a process for making the film in which the polypropylene-containing thermoplastic resin is extruded into a sheet with subsequent orientation of said sheet in the longitudinal direction to form a monoaxially oriented film; the film is then oriented in the transverse direction.

28 Claims, No Drawings

PROCESS FOR MAKING COATED POLYPROPYLENE FILM

This is a continuation of copending application Ser. No. 07/813,168, filed on Dec. 24, 1991 now abandoned.

FIELD OF THE INVENTION

The invention relates to an antifog agent coated, heat sealable polypropylene film structure that has good clarity, antifogging characteristics, and excellent heat sealability. The antifogging characteristics are provided by fatty acid esters of polyglycerol or sorbitan. The resultant film, which has good clarity, persistent antifogging characteristics, and excellent heat sealability, is useful for packaging refrigerated foods.

BACKGROUND OF THE INVENTION

Polyolefin films are resistant to moisture upon prolonged contact with water. Among them, biaxially oriented polypropylene film is the most resistant to water vapor penetration. Consequently, when these films are employed to package refrigerated moisture-producing materials, particularly fresh produce, they cause moisture to condense on their inner surface thereby fogging the package and either eliminating or substantially reducing the visibility of the food.

While various approaches have provided various degrees of success in reducing fogging, they have not provided a film that possesses the characteristics of the present invention.

The present invention provides an advantage, in that it provides a transparent, fog-resistant, readily heat-sealable film that may be heat-sealed to a variety of materials. Thus, the films of the present invention may be readily heat-sealed to polymers, copolymers and terpolymers of olefins, to polyethylene, to paper and to itself. Thus, the present invention provides a significant advantage over the prior art in that it can be employed either alone or in conjunction with other materials to provide packages for refrigerated foods.

SUMMARY OF THE INVENTION

A thermoplastic film comprising a base layer of a thermoplastic resin comprises antifogging, heat-sealable polypropylene film wherein the antifog agent is fatty acid esters of polyglycerol or sorbitan. The resultant film, which has good clarity, persistent antifogging characteristics, and excellent heat sealability, is useful for packaging refrigerated foods. The invention also provides a process for making the film which comprises polypropylene-containing thermoplastic resin which is extruded into a sheet, said sheet oriented in the longitudinal direction to form a monoaxially oriented film, said longitudinally oriented film containing said fatty acid esters and said film subsequently being oriented in the transverse direction.

DETAILED DESCRIPTION

An antifogging, heat-sealable polypropylene film is disclosed wherein the antifog agent incorporated is fatty acid esters of polyglycerol or sorbitan. The antifog agent can be either coated as an aqueous dispersion on a heat sealable skin layer of the film or compounded into the heat sealable skin resin prior to the film extrusion. When applied in the form of an aqueous dispersion, it can be applied onto the film either during the biaxial orientation of the film manufacturing process or after the film has been biaxially oriented. The resultant film, which has good clarity, antifogging characteristics, and excellent heat sealability, is useful for packaging refrigerated foods.

The fatty acid esters are fatty acid derivatives of polyglycerol or sorbitan. The fatty acids, contemplated herein have 10 to 20 carbon atoms. Preferably, the fatty acids contain 12 to 18 carbon atoms. Most preferably, the fatty acid esters are formed from the fatty acids selected from the group consisting of lauric, palmitic, oleic and stearic acid. The fatty acid ester derivatives can be formed of one or more of the fatty acids, of 10 to 20 carbon atoms, preferably, of 12 to 18 carbon atoms. Generally, the monoesters are employed.

As noted above and in accordance with the invention, two modes of substantially eliminating polypropylene fogging characteristics, with the fatty acid esters, may be undertaken. An aqueous dispersion of the fatty acid ester can be applied to the film during orientation. The proportion of the fatty acid ester in the dispersion can range from 1 to 10% by weight depending on the coating method employed. The coating layer is applied as an aqueous dispersion composition. Preferably, the dispersant comprises water. The use of water as the vehicle for dispersing the fatty acid ester minimizes cost while, at the same time, optimizes safety and minimizes environmental concerns. Those skilled in the art are aware that organic solvents create the possibility of explosion, fire and environmental problems. These concerns are eliminated by the use of water. If this mode is followed, preferably the aqueous dispersion of the fatty acid ester can be applied to the longitudinally oriented film prior to transverse orientation. Preferably, the polypropylene is a core layer in a multilayer coextruded film, which contains a polypropylene core layer and at least one heat sealable skin layer on one side of the core layer. The heat sealable layer can be a high density polyethylene, an ethylene-propylene copolymer, an ethylene-propylene-butene terpolymer or any other ethylene copolymer. The skin layer can be homopolymers of ethylene or copolymers of ethylene with one or more $C_3$–$C_{10}$ alpha-olefins. Thus, ethylene copolymers having one type of alpha-olefin monomeric units are possible, as well as terpolymers having ethylene and two types of alpha-olefin monomeric units. Particular examples of such polymers include ethylene/propylene copolymers, ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/I-hexene terpolymers and ethylene/propylene/1-butene terpolymers. The ethylene copolymers preferably contain at least about 80 percent by weight of ethylene units.

Alternatively, the fatty acid ester can be compounded with components of the film prior to film extrusion and orientation. In this mode the fatty acid ester is preferably compounded into the skin resin prior to the film extrusion. As noted above, in a preferred embodiment the polypropylene is a core layer in a multilayer coextruded film, which contains a polypropylene core layer and at least one heat sealable skin layer on one side of the core layer. The amount of the fatty acid ester which is compounded is an amount to substantially eliminate fogging tendencies of the polypropylene. Practically, this amount ranges from 0.5 to 5 p. hr.

The thermoplastic film of the invention comprises a base layer of a thermoplastic resin, which comprises polypropylene. The base layer, a relatively thick layer of the thermoplastic resin, is, as stated above, a resin which comprises polypropylene. That is, the base layer may be a polypropylene homopolymer, a blend of a polypropylene homopolymer and another olefinic polymer, a co-extrusion of a polypropylene homopolymer and an olefinic polymer and the like. More preferably, the base thermoplastic film comprises a polypropylene homopolymer and an olefinic polymer and the like. More preferably, the base thermoplastic film comprises a polypropylene homopolymer or a co-extrusion of a polypropylene homopolymer and an olefinic polymer. Still more preferably, the base thermoplastic film comprises a polypropylene homopolymer or a co-extrusion of a polypropylene homopolymer and an ethylene-propylene copolymer. Most preferably, the base thermoplastic film layer comprises a polypropylene homopolymer.

The above definition of thermoplastic resins within the contemplation of the polypropylene-containing thermoplastic film of this invention excludes thermoplastics other than olefinic polymers. Thus, such commercially important thermoplastic polymers, i.e., polyethylene terephthalate and polyvinyl chloride, are not included in the film of the present invention.

In another aspect of the present invention the above-described film may be part of a composite film wherein the film is laminated onto or supported by another film ply which may be a plastic, paper or metal film. In a particularly preferred embodiment, the composite film of the present invention is a laminate of the film of the present invention and a olefin terpolymer. Alpha olefins which can be polymerized with ethylene to produce the terpolymers can contain 3 to 8 carbon atoms. Suitable alpha olefins include propylene, butene-1, pentene-1, hexene-1, 4-methylpentene-1, heptene-1 and octene-1. The preferred alpha olefin is hexene-1.

The polypropylene-containing film is formed in a process wherein a polypropylene thermoplastic resin, which comprises the relatively thick polypropylene base layer, is melted and extruded through a slit die. The molten polypropylene-containing thermoplastic is cooled to form a solid sheet which is oriented in the longitudinal direction. The film is thereafter oriented in the transverse direction to form a biaxially oriented coated film.

In a preferred embodiment of this process the molten polypropylene-containing thermoplastic film is initially extruded through a slit die and cast onto a cooling drum wherein it is quenched to form a solid sheet. In a still more preferred embodiment, the quenching of the thermoplastic melt on the cooling drum is followed by reheating of the sheet prior to orienting in the longitudinal direction.

The step of orienting the thermoplastic sheet in the longitudinal direction is, in a preferred embodiment, provided by longitudinal direction stretching. Preferably, stretching in the longitudinal direction involves longitudinal stretching such that the film is increased from about 3 times to about 7 times its original length. More preferably, the film is increased from about 4 times to about 6 times its original length.

In a further preferred embodiment of the present invention the longitudinally stretched film is surface treated to improve surface wettability. Preferably, this surface treatment is provided by corona treatment or flame treatment. In a particularly preferred embodiment of this surface treatment step the surface that is subsequently coated is corona treated.

After completion of the coating operation, the film is preferably subjected to heating to accelerate drying of the coating which, as is discussed below, is applied as an aqueous dispersion or solution composition. Drying involves exposure of the film to elevated temperature. Depending upon the temperature employed in drying the coated monoaxially oriented film, the film may or may not be cooled or heated to obtain optimum temperature conditions during the next step, transverse orientation.

In the final essential step, the longitudinally oriented, coated film is oriented in the transverse direction. Preferably, orientation in the transverse direction is accomplished by transverse stretching. In the preferred embodiment wherein stretching is utilized to orient the film in the transverse direction, the film is stretched from about 6 to about 10 times its original width. More preferably, the longitudinally oriented films is stretched from about 7 to about 9 times its prestretched width.

In a preferred embodiment of this process, the film is annealed following transverse direction orientation. Annealing of the biaxially oriented film involves exposure of the film to elevated temperature. As in all heating steps, preferred temperatures are a function of the identity and constituency of the polypropylene-containing thermoplastic resin constituting the film.

In yet a further step embraced by the invention the uncoated surface of the biaxially oriented coated film is treated to improve its wettability and adhesion. Such treatment permits printing thereupon or the application of an adhesive followed by the application of another film ply to produce a laminate structure. In a preferred embodiment this surface treatment step is provided by coron treatment.

Heat sealability of the resulting films can be measured by crimp seal strengths at 240, 260, and 280 F. in terms of grams/inch. The sealer is set for 20 psi and 0.7 second dwell.

Antifog characteristics of the films are measured by a refrigeration fog test described as follows: Put 200 ml of water in a 600 ml beaker and cover with a sample of the test film. Place the beaker in a refrigerator at 4 C. Observe and record the appearance of the film over a period of 14 days. Ratings 1 to 5 are given based on the antifog performance described below:

| Description | Performance | Rating | Comments |
| --- | --- | --- | --- |
| An opaque layer of fine fog droplets | very poor | 1 | near zero visibility |
| An opaque layer of large droplets | poor | 2 | low visibility |
| A complete layer of large transparent drops | fair | 3 | medium visibility |
| Randomly scattered or large transparent drops | good | 4 | discontinuous film of water |
| A transparent film displaying no visible water drops | excellent | 5 | completely transparent |

The following examples are given to illustrate the scope of the present invention. Because these examples are given for illustrative purposes only, the invention should not be limited thereto.

EXAMPLE 1

An aqueous dispersion containing 1.0% by weight of a sorbitan ester (Atmer 100 obtained from ICI Americas Inc.) was coated on a three-layer coextruded polypropylene film using a #8 Mayer rod on a pilot scale coater. The base film comprises an ethylene-propylene-butene-1 terpolymer skin layer as the side to be coated, a polypropylene homopolymer core layer, and another terpolymer skin layer at a weight ratio of 3/94/3. The film surface was treated with corona discharge immediately prior to the coating application for improved surface wettability. The resultant coated film had good clarity, excellent heat sealability (320 g/in at 280 F.), and excellent antifog characteristics (an antifog rating of 5), and a coefficient of friction of 0.39.

EXAMPLE 2

An aqueous dispersion containing 0.8% by weight of a sorbitan ester (Atmer 100 obtained from ICI Americas Inc.) was coated in a manner similar to that of Example 1 on the three-layer coextruded polypropylene film. The resultant coated film had good clarity, excellent heat sealability (315 g/in at 280 F.), and good antifog characteristics (an antifog rating of 4) and a coefficient of friction of 0.37.

EXAMPLE 3

An aqueous dispersion containing 1.0% by weight of sorbitan palmitate (Glycomul P obtained from Lonza Inc.) was coated in a manner similar to Example 1 on the three-layer coextruded polypropylene film. The resultant coated film had good clarity, good heat sealability, good antifog characteristics (an antifog rating of 4), and a coefficient of friction of 0.34.

EXAMPLE 4

An aqueous dispersion containing 1.0% by weight of sorbitan palmitate (Glycomul P obtained from Lonza Inc.) was coated in a manner similar to Example 1 on the three-layer coextruded polypropylene film. The resultant coated film had good clarity, good heat sealability, good antifog characteristics (an antifog rating of 4), and a coefficient of friction of 0.33.

EXAMPLE 5

An aqueous dispersion containing 4.0% by weight of a polyglycerol ester (Glycolube AFA-1 obtained from Lonza) was placed in a gravure coater, which was located between the machine direction (MD) orienter and the transverse direction (TD) orienter of a pilot scale film orienter. An additive-free ethylene-propylene-butene-1 terpolymer skin resin (Sumitomo WS709N), a homopolymer core resin (Exxon 4252), and a terpolymer skin resin containing wax additives (Chisso 7703) were coextruded at a weight ratio of 3/94/3 through a flat sheet die at 250 C., cast onto a cooling drum and quenched at 30 C. The sheet, measured about 30 mil thick, was reheated to 140 C. and stretched 5-fold in the MD, then corona treated for improved surface wettability. When passing through the gravure coater, the MD-oriented film web, now about 6 mil thick, was coated on the additive-free terpolymer skin with the aqueous dispersion. The coated web was dried in pre-heat zones at 160 C., then stretched 8-fold in the TD and annealed at 160 C. The biaxially stretched film, measured 0.8 mil, may be corona treated on the uncoated side to improve the wettability and adhesion of inks and adhesives that might be applied later on. The resultant coated film had excellent antifog characteristics (an antifog rating of 5).

EXAMPLE 6

An aqueous dispersion containing 3.5% by weight of Glycolube AFA-1 was applied to an MD-oriented, three-layer coextruded polypropylene film in a manner similar to that of Example 5. The film is composed of a wax modified ethylene-propylene-butene-1 terpolymer skin resin (XPM 7880) as the side to be coated, a homopolymer core resin (Exxon 4252), and an ethylene-propylene resin containing antiblocking and slip additives (Fina 8573XA) at a weight ratio of 3/94/3. The resultant film had good antifog characteristics (an antifog rating of 4) and good heat seal strength (385 g/in @ 280F. by crimp seal).

EXAMPLE 7

An aqueous dispersion containing 3.5% by weight of Glycolube AFA-1 and 0.25% by weight of sodium lauryl sulfate was applied to an MD-oriented, three-layer coextruded polypropylene film in the same manner as described in Example 6. The resultant film had good antifog characteristics (an antifog rating of 4) and good heat seal strength (380 g/in @ 280F. by crimp seal).

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the subject invention should be limited only by the appended claims.

What is claimed is:

1. A process for making a thermoplastic film comprising coextruding (1) a thermoplastic resin, said thermoplastic comprising polypropylene, and (2) a resin containing ethylene units into a sheet; orienting said sheet in the longitudinal direction to form a monoaxially oriented film; coating said resin containing ethylene units with a layer of a polyglycerol ester or sorbitan ester of a fatty acid of 10 to 20 carbon atoms; and orienting said coated film in the transverse direction to form a biaxially oriented film.

2. A process in accordance with claim 1, wherein said thermoplastic resin is selected from the group consisting of a polypropylene homopolymer, a blend of a polypropylene homopolymer and another olefinic polymer, a co-extrusion of a polypropylene homopolymer and another olefinic polymer and mixtures thereof.

3. A process in accordance with claim 1, wherein said step of extruding said resin into a sheet comprises melting said polypropylene-containing resin; extruding said melt through a slit die; and casting said melt onto a cooling drum.

4. A process in accordance with claim 1, wherein said step of longitudinally orienting said sheet into a film comprises stretching said cast sheet to between about 3 and about 7 times its original length.

5. A process in accordance with claim 1, wherein said step of transversely orienting said coated film comprises stretching said longitudinally oriented film to between about 6 times and about 10 times its original width.

6. A process in accordance with claim 1, comprising the step of treating the surface of the longitudinally stretched film to improve surface wettability and adhesion prior to said coating step.

7. A process in accordance with claim 6, wherein said surface treatment constitutes a corona treatment.

8. A process in accordance with claim 1, comprising annealing said coated biaxially oriented film by exposing said film to elevated temperature.

9. A process in accordance with claim 1, wherein the uncoated side of said biaxially oriented film is surface treated to improve its wettability and adhesion.

10. A process in accordance with claim 9, wherein said surface treatment of said uncoated side of said biaxially oriented film is provided by a corona treatment.

11. A process for making a biaxially oriented polypropylene film comprising extruding a polypropylene homopolymer into a cast sheet; stretching said polypropylene sheet in the longitudinal direction to form a monoaxially oriented polypropylene film; coating said longitudinally oriented polypropylene film with a dispersion of a polyglycerol ester or sorbitan ester of a fatty acid of 10 to 20 carbon atoms; and stretching said longitudinally oriented, coated film in the transverse direction.

12. A process in accordance with claim 11, comprising the step of corona treating said longitudinally oriented film prior to said coating step.

13. A process for making a thermoplastic film comprising coextruding (1) a thermoplastic resin, said thermoplastic comprising polypropylene, and (2) a resin containing ethylene units into a sheet; orienting said sheet in the longitudinal direction to from a monoaxially oriented film; coating said resin containing ethylene units with a layer of a sorbitan ester of a fatty acid of 10 to 20 carbon atoms; and orienting said coated film in the transverse direction to form a biaxially oriented film.

14. A process in accordance with claim 13, wherein said thermoplastic resin is selected from the group consisting of a polypropylene homopolymer, a blend of a polypropylene homopolymer and another olefinic polymer, a co-extrusion of a polypropylene homopolymer and another olefinic polymer and mixtures thereof.

15. A process in accordance with claim 13, wherein said step of extruding said resin into a sheet comprises melting said polypropylene-containing resin; extruding said melt through a slit die; and casting said melt onto a cooling drum.

16. A process in accordance with claim 13, wherein said step of longitudinally orienting said sheet into a film comprises stretching said cast sheet to between about 3 and about 7 times its original length.

17. A process in accordance with claim 13, wherein said step of transversely orienting said coated film comprises stretching said longitudinally oriented film to between about 6 times and about 10 times its original width.

18. A process in accordance with claim 13, comprising the step of treating the surface of the longitudinally stretched film to improve surface wettability and adhesion prior to said coating step.

19. A process in accordance with claim 18, wherein said surface treatment constitutes a corona treatment.

20. A process in accordance with claim 13, comprising annealing said coated biaxially oriented film by exposing said film to elevated temperature.

21. A process in accordance with claim 13, wherein the uncoated side of said biaxially oriented film is surface treated to improve its wettability and adhesion.

22. A process in accordance with claim 21, wherein said surface treatment of said uncoated side of said biaxially oriented film is provided by a corona treatment.

23. A process for making a biaxially oriented polypropylene film comprising extruding a polypropylene homopolymer onto a cast sheet; stretching said polypropylene sheet in the longitudinal direction to form a monoaxially oriented polypropylene film; coating said longitudinally oriented polypropylene film was a dispersion of a sorbitan ester of a fatty acid of 10 to 20 carbon atoms; and stretching said longitudinally oriented, coated film in the transverse direction.

24. A process in accordance with claim 23, comprising the step of corona treating said longitudinally oriented film prior to said coating step.

25. The process of claim 13, wherein, after transverse orientation, the film is subjected to contact with moisture producing materials.

26. The process of claim 13, wherein, during said coating, the sorbitan ester is dispersed in water.

27. The process of claim 25, wherein, during said coating, the sorbitan ester is dispersed in water.

28. The process of claim 13, wherein, after transverse orientation, the film is subjected to contact with moisture producing materials.

* * * * *